United States Patent [19]
Holzer

[11] 4,428,438
[45] Jan. 31, 1984

[54] PERCUSSIVE DRILL WITH SAFETY INTERLOCK FOR REVERSING GEAR

[75] Inventor: Peter Holzer, Solothurn, Fed. Rep. of Germany

[73] Assignee: Scintilla AG, Solothurn, Switzerland

[21] Appl. No.: 165,801

[22] Filed: Jul. 3, 1980

[30] Foreign Application Priority Data

Aug. 10, 1979 [DE] Fed. Rep. of Germany ....... 2932470

[51] Int. Cl.³ .................. B23B 45/16; B25D 17/10
[52] U.S. Cl. .................................................. 173/48
[58] Field of Search .................. 173/47, 48; 74/22 A, 74/56, 22 R

[56] References Cited

U.S. PATENT DOCUMENTS

| | | | |
|---|---|---|---|
| 3,799,275 | 3/1974 | Plattenhardt et al. | 173/48 |
| 4,158,970 | 6/1979 | Laughon | 173/48 X |
| 4,223,744 | 9/1980 | Lovingood | 173/48 |
| 4,229,981 | 10/1980 | Macky | 173/48 |

Primary Examiner—Werner H. Schroeder
Assistant Examiner—Andrew M. Falik
Attorney, Agent, or Firm—Frishauf, Holtz, Goodman & Woodward

[57] ABSTRACT

A reversing switch, controlling the direction of rotation of the working spindle of a combination motor-driven hand tool, displaces a rack rod in a direction parallel to the axis of the spindle to provide an interlock both with a percussion boring feature and with provisions for seating attachments on the chuck sleeve of the tool, such as a circular saw. When the percussion boring feature is put into operative position, the rack rod is caused to prevent moving the reversing switch from right-hand rotation to left-hand rotation. When the switch is set for left-hand rotation, the seating surface of the chuck sleeve locks to prevent mounting an attachment and, at the same time, the percussion boring mechanism is blocked in an out-of-service position.

23 Claims, 7 Drawing Figures

PERCUSSIVE DRILL WITH SAFETY INTERLOCK FOR REVERSING GEAR

This invention concerns motor-driven combination tools capable of being driven either in the normal right-hand rotation sense or in the opposite or left-hand rotation sense, and especially tools of the hand-held type.

It is useful in such tools to provide for rotation of the working shaft in both directions of rotation, the so-called right-hand rotation being the normal and usual direction of rotation of the spindle that carries a chuck for rotary tools such as drills, screw drivers, and so forth. The opposite direction of rotation is used mainly with screw driver bits, particularly for removing screws from work pieces, although also occasionally for screwing in screws with left-hand threads as is sometimes required.

Not only is it desirable for a rotary tool of a form of an electric drill to be able to be driven in both directions, but it is also desirable for it to be used with a variety of attachments and/or built-in features. Attachments are provided for sawing, routing, or the like. With reversible power tools heretofore equipped with such attachments, it is possible to drive the spindle carrying the attachment in left-hand rotation when the attachment is mounted. Such a rotation of attachments, such as circular saws or routing tools, leads not only to damage or destruction of the attachment, but also to a considerable risk of injury to the user of the tool.

Reversible power tools of this kind are also commonly equipped with built-in features such as percussion boring action. If, when this feature is coupled in for use, and the drill is operated with left-hand rotation, the inevitable result is the destruction of the hard-metal drill.

SUMMARY OF THE INVENTION

It is an object of the present invention to provide a safety interlock for a reversible power tool, particularly of the hand-held type, which will both prevent left-hand rotation when a feature or attachment not compatible therewith is coupled in, or on, the tool and will also prevent the coupling of a feature, or the mounting of an attachment, when the tool is set for left-hand rotation.

Briefly, such an interlock is coupled with the reversing switch and has at least one locking member for blocking a built-in feature and/or for blocking the provision of an attachment when the reversing switch is in the left-hand rotation position, which member is also disposed so that when the feature or attachment, as the case may be, is coupled to the tool, the reversing switch is blocked so that it cannot take the left-hand rotation position. Preferably, this is accomplished by connecting to the reversing switch a rod that moves lengthwise and engages the blocking member or members and for each blocking member has an actuating surface and a catch surface, in the latter of which the blocking member can be caught. Preferably, the rod is an axially guided rack rod and the reversing switch is a pivoted device geared thereto. Preferably, the actuating surface of the rod is an oblique surface, most preferably of furstoconical shape, and the catch surface extends perpendicularly to the length of the rod and limits at one end the actuating surface, preferably as an annular stop shoulder. The blocking member is preferably, at least in the case of a built-in feature, a rod that is lengthwise, displaceable, extending essentially perpendicularly to the rack rod actuatable by the reversing switch.

In a further development of the invention, the built-in feature is a percussion boring feature controlled by a rotatable plug and having a locking groove that faces the locking rod only in the coupled-in position for the percussion boring feature. From this locking groove there is a transition cavity surface for actuating the locking rod which allows the locking rod to take its free position when the feature is uncoupled, with further details of operation set forth in the more complete description given below, where there are also given further details regarding the interlock with attachments mountable on the front of the tool.

BRIEF DESCRIPTION OF THE DRAWINGS

The invention is further described by way of example with reference to the attached drawings, in which.

DESCRIPTION OF AN ILLUSTRATIVE EMBODIMENT

Figure 1:
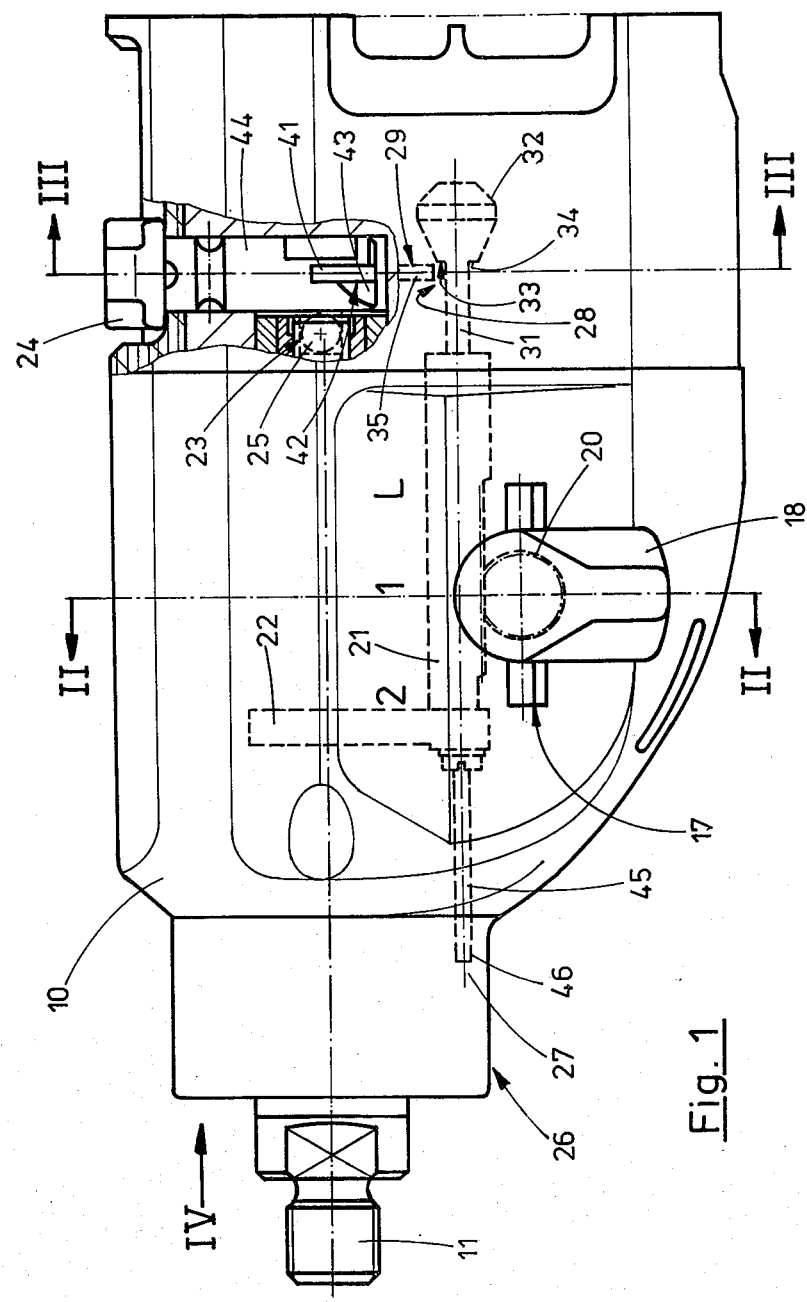
FIG. 1 is a diagrammatic side view, partly in section of a home workshop-type of combination hand-held power tool, omitting the rear and pistol-grip portions.

The embodiment illustrated in FIGS. 1-5 of an electric motor driven hand tool, designed to serve as a combination tool in a home workshop, has a casing 10 and a working chuck-equipped spindle 11 mounted in suitable bearing in the casing 10. The spindle 11 is driven by a gear train 12 by an electric motor 100, only symbolically shown in the drawing. The spindle 11 can be driven in left-hand rotation as well as in right-hand rotation. In a known way, the gear train 12 has an intermediate transmission gear 13 that is driven by the electric motor in the usual way through a safety coupling (not shown). On the working spindle 11 are a number of gear wheels 14 corresponding to the number of speeds (gear ratios). These gear wheels are selectably movable, by a pulling wedge 19, into a position where the selected gear is coupled firmly for rotation with the spindle 11.

In the present embodiment, two speeds of right-hand rotation (designated "1" and "2" in heavy numerals in FIG. 1) are provided for the spindle 11 and one speed in left-hand rotation (designated "L" in FIG. 1). There are accordingly three spur gears 14 seated on the spindle 11, of which the gear 15 is visible in FIG. 2. The gear 15 when connected for rotation with the spindle 11 drives the latter in left-hand rotation and, for this purpose, is engaged through a reversing gear 16 with the intermediate transmission gear 13. The two other gears 14 mesh directly with the transmission 13 and when one of them is set for rotation with the spindle 11, the latter is driven in right-hand rotation and two speeds are provided according to which of them is so set.

Figure 2:
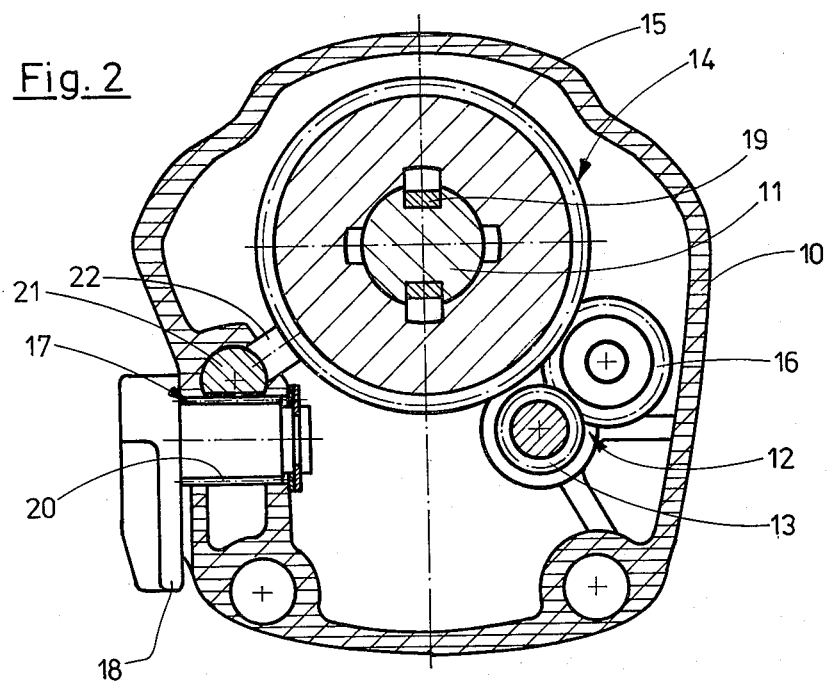
FIG. 2 is a cross-section along the line II—II of FIG. 1.

For shifting gears a reversing mechanism 17 shown in FIGS. 1 and 2 engages the gear train 12, which mechanism in the illustrated case also serves for shifting between speeds in right-hand rotation of the spindle 11. This reversing mechanism 17 has a reversing lever 18 having at least one position for right-hand rotation, in this case positions "1" and "2" for right-hand rotation and a position "L" for left-hand rotation. The reversing mechanism 18 is is designed to be manually switched over from one position to another. For this purpose, it is pivoted on the casing 10 for swinging movement and equipped with a toothed segment 20 (in this case, a full crown gear) which meshes with an axially displaceable rack rod. The rack rod 21 carries a gear shift finger 22 that engages the pulling wedge 19 and displaces the latter corresponding to the position of the reversing mechanism 18, in such a way that the corresponding gear 14 is brought into locking for rotation with the spindle 11 by appropriate displacement of the wedge 19.

The illustrated combination tool has a known type of percussion boring mechanism 23, described, for example, in U.S. Pat. No. 3,799,275 which is visible in section in FIG. 1. A rotatable command plug 24 is provided for putting the percussion boring device 23 into or out of operative condition. This plug has one angular position for operativeness of percussion boring and another for the inoperative condition thereof, these two positions being offset by about 180° from each other. In FIG. 1 the command plug 24 is shown in the position for disconnection of the percussion boring device. In this position, the percussion boring device 23 is blocked by the ball 25. The ball 25 corresponds to the ball 43 of U.S. Pat. No. 3,799,275 and the cylindrical member 44 likewise corresponds to the member 42 of that patent.

The casing 10 of the combination tool has an annular chuck sleeve 26 mounted on the forward end of the casing 10, the outer surface of which provides a seating surface for mounting attachments, such as saws, routing tools or the like. In the case of a disk saw accessory device, for example, the saw disk is firmly connected for rotation with the spindle 11, but the mounting for the guiding frame is pushed onto the chuck sleeve 26 and firmly clamped there. The mounting for the guide frame for the saw is firmly fitted, substantially exactly, to the sleeve 26.

Figure 3:
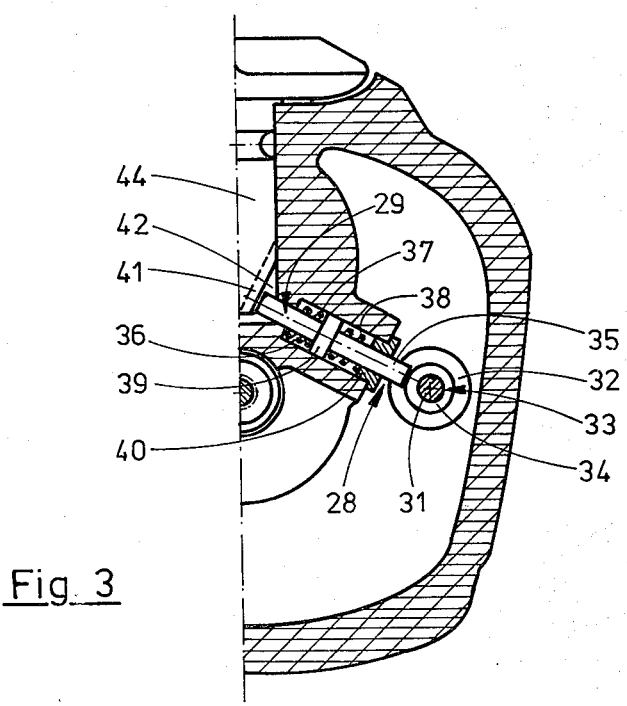
FIG. 3 is a cross-section along the line III—III of FIG. 1, showing only the cross-section on one side of the machine axis.

For preventing left-hand rotation of the spindle 11 when the percussion boring device is in operative position or when an accessory device is mounted on the sleeve 26, an interlock device 28 is provided in the combination tool that is coupled with the reversing control 18. A part of this interlock 28 is a blocking member 29 that engages the percussion boring device 23 in such a way that operative connection of the percussion boring device 23 is blocked when the reversing control is in its left-hand rotation position "L" and, conversely, when the percussion boring device 23 is in its operative condition, the turning of the reversing control 18 into its left-hand rotation position "L" is blocked (FIGS. 1 and 3).

The interlock device 28 has still another blocking member 30 (FIGS. 4 and 5) that is so disposed on, or in immediate juxtaposition to, the seating surface 27 of the sleeve 26, that when the reversing control 18 is in its left-hand rotation position "L," the seating of an accessory device on the surface 27 of the chuck sleeve 26 is prevented and conversely, when an accessory device is seated on the surface 27, the turning of the reverse control 18 into its left-hand rotation position "L" is blocked. Of course, if the tool is not equipped for percussion boring, or if although a percussion boring mechanism is provided there is no possibility for seating accessory devices on the chuck sleeve, the corresponding one of the blocking members 29 and 30 can be omitted.

As shown in broken lines in FIG. 1, the interlock device 28 for the percussion boring feature 23 comprises an axially movable rod 31 equipped to operate in engagement with the blocking member 29. The rod 31 carries a cam 32 that is oblique to the axis of the rod 31 and is designed to actuate the blocking member 29 as described below. The cam 32 is in the present case illustrated as having a frustoconical surface, which may be convenient from the point of view of manufacture although it is evident that only the portion of the surface facing the blocking member 29 is important. The rod 31 also carries a catch surface 33 onto which the blocking member 39 can fall (FIGS. 1 and 3) so as to prevent leftward movement of the rod 31. This catch surface 33 is in this case a small step perpendicular to the axis of the rod 31 at the small end of the frustoconical cam surface of the cam 32, thus forming an annular top shoulder 34 when the cam surface is frustoconical.

The blocking member 29 is in the illustrated case in the form of a blocking pin 35 displaceable axially and perpendicular to the axis of the rod 31. As may be seen in FIG. 3, the blocking pin 35 is mounted in a stepped bore 36 provided on an internal portion of the casing 10 and is subjected to the force of two resilient position-restoring members acting in opposite directions, which in this case are in the form of helical springs 37 and 38 which normally maintain the pin 35 in the basic or neutral position illustrated in FIG. 3.

The springs operate as compression springs and therefore do not need to be attached to the pin 35 in the illustrated case. One end of the spring 37 bears against the annular flange 39 provided near the middle of the pin and at the other end bears again the shoulder or step of the stepped bore 36. The spring 38 likewise bears against the flange 39 at one end, while its other end bears against a closure bushing 40 that is set in the end of the bore 36 and held there (as by screw threading or friction fitting) fits and guides the pin 35. The pin 35 makes possible a mechanical linkage or coupling between the rod 31 on the one hand and the rotary plug 24 that puts the percussion boring feature into or out of operation.

The rotary plug 24 has a locking groove 41 (FIG. 1) that faces the locking pin 35 only when the plug 24 is set for the operative condition of the percussion boring feature. In the shift direction of the rotary plug 24, the locking groove 41 connects to a cavity 42 that continuously guides from a point in the groove wall near but not at the groove bottom (see FIG. 3) over to the outer surface of the rotary plug 24, providing a cam surface 43 for the locking pin. In the basic or neutral position of the pin 35 illustrated in FIG. 3 the pin lies with one end so located that when it faces the locking groove 41 it is immediately in front of it without extending into it, but that end of the pin extends far enough to project into the adjacent cavity 42 so as to ride over the cam surface 43 as the plug 24 is rotated. In the neutral position of the blocking pin 35 illustrated in FIG. 3, the other end of the pin similarly extends to a point just above the shoulder 34 which bounds one end of the cam surface 32.

Consequently, the pin 35 is in the illustrated basic or neutral position only when the rotary command plug 24 is at or near the position shown in FIG. 1 in which the percussion boring device in inoperative and when the reversing switch 18 is in one of its right-hand rotation positions, for example, the position illustrated in FIG. 1, but possibly also in the position "2."

If the reversing switch 18 moved counterclockwise from the position shown in FIG. 1 until it reaches the position "L," or left-hand rotation of the spindle 11, the toothed segment 20 of the rack rod 21 will shift to the left in FIG. 1. In consequence, the cam surface 32 of the rod 31 will pass along the end surface of the blocking pin 35 and shift the latter with the compression of the helical spring 37, so that its other end extends into the locking groove 41 of the rotary plug 24. So long as the reversing switch 18 remains in its left-hand rotation position "L," an end of the blocking pin 35 will remain in the locking groove 41 and the rotary plug 24 will be blocked in position. The percussion boring mechanism 23 is then held in its inactive position and cannot be put into service. Putting it into service is possible only after the reversing switch 18 is swung back into one of its right-hand rotation positions "1" or "2" whereby the rod 31 will again be displaced to the right and disengage the cam surface 32 from the blocking pin 35, so that the latter returns to its neutral position illustrated in FIG. 3 by the restoring force of the helical spring 37.

If now with the blocking pin 35 in this neutral position the rotary command plug 24 is turned counter-clockwise with reference to FIG. 1 in order to put the concussion boring mechanism 23 into operative condition, the cam surface 43 of the cavity 42 displaces the blocking pin 35 against the restoring force of the helical spring 38. The end surface of the pin 35 is brought to lie on the outer surface 44 of the rotary plug 24. The resulting displacement of the pin 35 brings its other end nearer to the rod 31 and engages it adjacent to the stop shoulder 34 of the rod 31. In consequence, the axial displacement of the rod 31 is limited so that thereafter the rod 31 can move only to the right with reference to FIG. 1, for shifting over to the second gear of right-hand rotation as can be produced by clockwise rotation of the reversing switch 18. On the other hand, counter-clockwise turning of the reversing switch 18 into the left-hand rotation position "L" is safely prevented since displacement of the rack rod 21 and thereby of the rod 31 to the left from the position illustrated in FIG. 1 is blocked by the juxtaposition of the blocking pin 35 against the stop shoulder 34. Thus, when the percussion boring mechanism 23 is in operative position, left-hand rotation of the spindle of the combination tool cannot be switched in. Left-hand rotation can then be provided again only after the command rotary plug 24 is again brought into its position for inactivating the percussion boring mechanism, in which position the cavity 42 and the locking groove 41 of the plug 24 make possible restoration of the blocking pin 35 to its neutral position.

Figure 5:
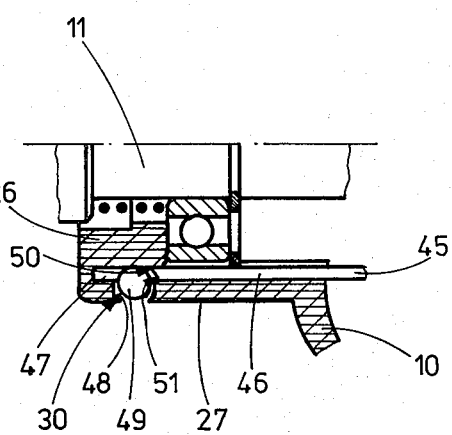
FIG. 5 is a partial longitudinal section of the device of FIG. 1 on the line V—V of FIG. 4.

The blocking device 28 has another push rod 45 which, just like the rod 31 already described, is rigidly connected to the rack rod 21 (FIGS. 1 and 5). This rod 45 extends, with its operating end portion 46 proceeding all the way to the region of the seating surface 27 providing for seating attachments on the chuck sleeve 26. A bore 47 directed parallel to the working spindle 11 is provided in the chuck sleeve 26 into which the operating end portion 46 of the rod 45 penetrates (FIG. 5). Also in the chuck sleeve 26 is a cage cavity 48 in which a locking body, here a blocking ball 49 is held in a manner allowing radial play, the ball 49 constituting in this case the more generally referred to blocking member 30.

In one of the blocking positions of the blocking member 30, the blocking ball 49 projects into the bore 47 and in the other blocking position the ball 49 projects partly out of the cage cavity 48 and sticks out from the seating surface 27. In the last-named blocking position it is not possible to seat an attachment onto the seating surface 27 of the chuck sleeve 26 because the attachment would bump into the projecting ball 49 so that the attachment could not be further pushed onto the surface 27. The push rod 45, just like the rod 31 has cam surface 50 and a catch surface 51 for the blocking member, which is in this case the ball 49, both of these surfaces being formed by the wedge-like tapering end portion 46 of the rod 45 as shown in FIG. 5.

If the reversing switch 18 is swung into its left rotation position "L", the rack rod 21 is displaced, as already mentioned, to the left in FIG. 1. This displaces the rod 45 with its operating end 46 further into the bore 47 in the chuck sleeve 26. With its advance, the rod 45 forces the blocking ball 49 fully out of the bore 47. If the left rotation position "L," of the switch 18, the operating portion 46 of the rod 45 lies behind the ball 49 and prevents the latter from being pushed back into the sleeve 26. The ball 49 therefore continues to stick out of the seating surface 27 and prevents the mounting of an attachment there.

When the switch 18 is in the position shown in FIG. 1, the mounting of an attachment on the chuck sleeve 26 is possible, because the rod 45 then takes the position shown in FIG. 5 and the ball 49 can be pressed into the bore 47 upon sliding on an attachment until it no longer projects beyond the surface 27. If then the attachment is clamped fast on the chuck sleeve 26, the reversing switch 18 can no longer be swung into its left rotation position "L" since in this case the rod 45 presses with its wedge-shaped end against the blocking ball 49. Since the clamp ring 130 of the mounted attachment blocks the ball 49 in its position shown in FIG. 5, a further displacement of the rod 45 and thereby swinging of the switch 18 toward its left-hand rotation position "L" is prevented.

Figure 7:
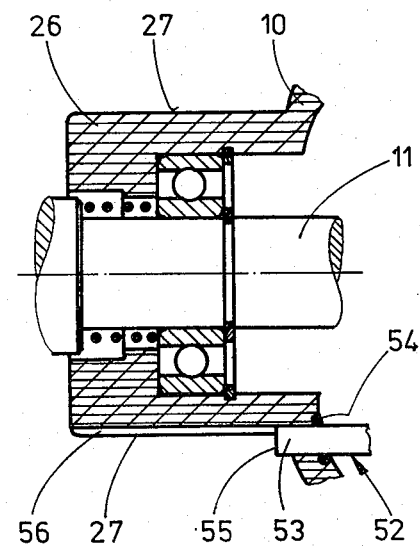
FIG. 7 is a section of the front portion of the modified FIG. 1 device, with the upper half a vertical section and the lower half an oblique section indicated by the section line VII—VII of FIG. 6.

In the embodiment illustrated in FIG. 7 of a modified kind of interlock for combination hand tool, a rod 52 connected in a similar way with the rack rod 21 and having an operating end portion 53 extends out to the seating surface 27 of the chuck sleeve 26. In this embodiment the rod 52 also provides in itself the blocking member that was separately provided in the first embodiment that was illustrated in detail in FIGS. 4 and 5. In the second embodiment, a passage 54 is provided in the casing 10 outside of the chuck sleeve 26, through which the rod 52 with its operating end 53 extends parallel to the operating spindle and comes out through the seating surface 27. In one locking position of the rod 52 the end surface 55 reaches close to the seating surface 27 (FIG. 7); whereas in the other blocking position, the operating end portion 53 extends at least partly across the seating surface 27. For guiding the end portion 53 along the chuck sleeve 26, the latter is provided with a guiding groove 56 running parallel to the axis of the spindle 11.

Figure 4:
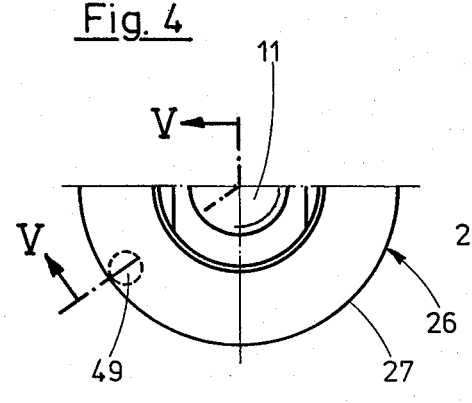
FIG. 4 is a partial front view of the device of FIG. 1.
Figure 6:
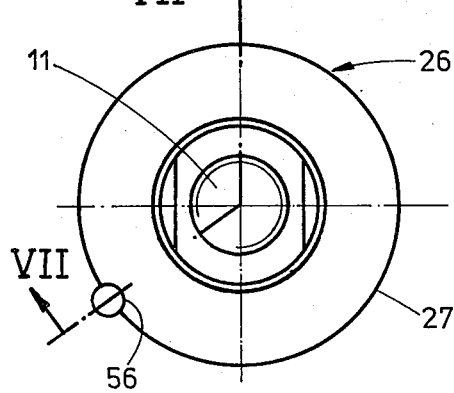
FIG. 6 is a front view of a modification of the device of FIG. 1 to illustrate the significance of FIG. 7.

The manner of operation of the modified form of locking device 28 illustrated in FIGS. 6 and 7 is essentially the same as that described with reference to FIGS. 4 and 5. If the reversing switch 18 is in its left rotation position "L," the operating portion 53 of the rod 52 is displaced so far along the seating surface 27 that an attachment cannot be mounted on that surface. On the other hand, if an attachment is already clamped onto the seating surface 27, the rod end 55 of the rod 52 is directly facing the mounting of the attachment and bracing the surface 27 as a consequence of which a displacement of the rod 52 to the left in FIG. 7 is prevented. In consequence, the reversing switch cannot be swung out of its position shown in FIG. 1 into its left rotation position "L".

Although the invention has been described with reference to particular illustrative embodiments, it is to be understood that variations and modifications are possible within the inventive concept.

For example, the reversing control 18 need not be a swiveled member but could be a sliding member with an actuating grip moving parallel to the rod 21 and therefore in fixed relation thereto.

We claim:

1. A motor-driven combination rotary tool having a casing, a motor therein, a working spindle mounted thereon carrying a bit-holding chuck, manually settable drive-reversing means for causing said spindle to be driven by said motor either in normal right-hand rotation or in the opposite left-hand rotation, and equipped or designed to power optionally usable means for operating detachable auxiliary tools which are compatible only with right-hand rotation of said spindle and also comprising the improvement which consists in that:

a mechanical interlock device is provided which is mechanically coupled with said drive reversing means independently of the application of rotary force to said spindle for blocking and thereby rendering inoperative said optionally usable auxiliary tool operating means when said drive-reversing means are set for left-hand rotation of said spindle and for blocking, and thereby preventing left-hand rotation of said spindle, so long as said optionally usable auxiliary tool operating means are mechanically coupled to said spindle.

2. A rotary tool as defined in claim 1, in which said auxiliary tool operating means are a built-in feature of said tool located within said casing and having a manually operable member for putting said auxiliary tool operating means selectively into or out of operative connection with said motor and spindle.

3. A rotary tool as defined in claim 2, in which a percussion device for providing a repetitively percussive force for application to said spindle while the latter is driven in right-hand rotary motion is connected to said auxiliary tool operating means.

4. A rotary tool as defined in claim 3, in which said interlock device comprises a manually operable control setting selector member (18) and a longitudinally displaceable rod (31) mechanically coupled to said selector member (18) and blocking means (29) in the form of an axially displaceable blocking pin (35) arranged for displacement at essentially right angles to the direction of displacement of said rod (31), said blocking pin (35) being disposed for engagement with said manually operable member (24) for putting said auxiliary tool operating means selectively into or out of operative connection with said motor and said spindle and for engagement with said rod (31), the latter having a cam surface (32) and a catch surface (33) for engagement with said blocking pin (35), said manually operable member (24) for putting said auxiliary means selectively into or out of operative connection having a catch groove (43) and a cam cavity (42) for engagement with said blocking pin (35), the latter being held by restoring springs (37,38) urging it to a neutral position in which it does not extend either into said catch groove (41) or into engagement with said catch surface (33) and in which it is engageable by said cam surface (32) and by said cam cavity (42) as the case may be.

5. A rotary tool as defined in claim 4, in which said restoring springs (37,38) are constituted as helical springs.

6. A rotary tool as defined in claim 5, in which said blocking pin (35) is disposed in a stepped bore (36) of said casing (10) and in a bushing (40) closing off one end of said bore, and in which said helical springs (37,38) respectively bear against the step of said stepped bore (36) and said bushing (40).

7. A rotary tool as defined in claim 5, in which said manually operable member (24) for said auxiliary tool operating means is a rotary plug arranged for substantially 180° rotation between the respective positions for putting said tool operating means into and out of said operative connection.

8. A rotary tool as defined in claim 1, in which said auxiliary tool operating means are constituted by an auxiliary attachment, a first part of which is mountable on and drivable by said spindle and a second part of which is mountable on a surface portion of a part of said casing.

9. A rotary tool as defined in claim 8 having an external surface suitable for clamp-mounting of said second part of said auxiliary attachment and in which a casing is provided which has a chuck-protecting sleeve.

10. A rotary tool as defined in claim 1, in which said auxiliary tool operating means include built-in first auxiliary tool operating means located in said casing and having a manually operable member for putting said first auxiliary tool operating means selectively into or out of operative connection with said motor and spindle and second auxiliary tool operating means constituted by an attachment a first part of which is mountable on and drivable by said spindle and a second part of which is mountable on a surface portion of a part of said casing, and in which tool said interlock device is constructed so as to block both said first and second auxiliary means when said drive-reversing means are set for left-hand rotation of said spindle and so as to block setting of said drive reversing means for left-hand rotation of said spindle whenever either said first or said second auxiliary means are mechanically coupled to said spindle.

11. A rotary tool as defined in claim 1, in which said casing is of a size and shape suitable for hand-held operation of said tool.

12. A rotary tool as defined in claim 1, in which said casing is of a size and shape suitable for hand-held operation of said tool, said motor is an electric motor of a type having a single operating direction of rotation, and said drive-reversing means are mechanical gear-shifting means.

13. A rotary tool as defined in claim 1, in which said casing is of a size and shape suitable for hand-held operation of said tool, said motor is an electric motor of a type having a single operating direction of rotation, and said drive-reversing means are mechanical gear-shifting means also operable to provide at least two gear ratios of coupling between said motor and said spindle for at least one direction of rotation of said spindle.

14. A motor-driven combination rotary tool having a casing, a motor therein, a working spindle mounted thereon carrying a bit-holding chuck manually settable drive-reversing means for causing said spindle to be driven by said motor either in normal right-hand rotation or in the opposite left-hand rotation, and equipped or designed to power optionally usable auxiliary tool operating means compatible only with right-hand rotation of said spindle and also comprising the improvement which consists in that:

a mechanical interlock device is provided for blocking and thereby rendering inoperable said optionally usable auxiliary tool operating means when said drive-reversing means are set for left-hand rotation of said spindle so long as said optionally usable tool operating means are mechanically coupled to said spindle, said interlock device comprising a manually operable control setting selector member (18) and at least one longitudinally displaceable rod (31, 45; 53) mechanically coupled to said selector member (18) and disposed for engagement with blocking means (29, 30) of said auxiliary tool operating means, and includes on at least one said rod a cam surface (32, 50) and a catch surface (33, 51) for at least one blocking member (35, 49) of said blocking means (29, 30).

15. A rotary tool as defined in claim 14, in which said at least one rod (31,45) includes an axially displaceable rack portion and said selector member (18) is a swivel device provided with a gear meshing with said rack portion of said at least one rod.

16. A rotary tool as defined in claim 14, in which said cam surface (32) is oblique to the direction of displacement of said rod and said catch surface (33) stands off substantially perpendicular to displacement of said rod and provides an end boundary for said cam surface (32), and in which said blocking member is a longitudinally movable pin (35) displaceable axially and substantially perpendicular to said direction of displacement of said at least one rod (31).

17. A rotary tool as defined in claim 16, in which said cam surface is frusto-conical and in which said catch surface is an annular shoulder (34).

18. A rotary tool as defined in claim 14, in which said casing has a chuck-protecting sleeve (26) having a surface (27) for mounting at least a part of one said auxiliary tool operating means, and in which at least one rod (45,52) has an end portion (46,53) disposed for movement into or away from the immediate vicinity of said mounting surface (27) of said sleeve (26).

19. A rotary tool as defined in claim 18, in which said sleeve (26) is provided with a bore (47) running parallel to said spindle (11), in which bore said end portion (46) of said rod (45) penetrates, said sleeve having also a cage opening (48) communicating with said bore (47) for confining said blocking member (49) while allowing radial displacement thereof, said rod and said end portion thereof being so disposed and said end portion being so shaped that displacement thereof into blocking position of said blocking means (30) causes said blocking body (49) to extend out of said cage opening (48) to project outward from said mounting surface (27).

20. A rotary tool as defined in claim 19, in which said blocking body (49) is a ball.

21. A rotary tool as defined in claim 10, in which said cam surface (50) and said catch surface (51) of said rod (45) are provided by wedge-shaped tapering of the end portion (46) of said rod (45).

22. A rotary tool as defined in claim 20, in which said at least one rod (52) also constitutes, by an end portion thereof, said blocking means, and in which said casing is provided with an opening for allowing at least one rod to be displaced so as to interfere with said mounting surface (27) of said sleeve in movement parallel to said spindle (11).

23. A rotary tool as defined in claim 22, in which said sleeve has a groove (56) running parallel to said spindle (11) in said mounting surface (27) for guiding said portion (53) of said at least one rod (52).

* * * * *